United States Patent
Gupta et al.

(10) Patent No.: US 11,675,579 B2
(45) Date of Patent: Jun. 13, 2023

(54) SYSTEMS AND METHODS FOR DEPLOYING ENTERPRISE SOFTWARE UPDATES

(71) Applicant: The Gap, Inc., Albuquerque, NM (US)

(72) Inventors: Ajay Gupta, Dublin, CA (US); Amirul Islam, San Ramon, CA (US); Shivkumar Krishnan, Los Altos, CA (US)

(73) Assignee: The Gap, Inc., San Francisco, CA (US)

( * ) Notice: Subject to any disclaimer, the term of this patent is extended or adjusted under 35 U.S.C. 154(b) by 286 days.

(21) Appl. No.: 16/994,588

(22) Filed: Aug. 15, 2020

(65) Prior Publication Data

US 2021/0072970 A1    Mar. 11, 2021

Related U.S. Application Data

(60) Provisional application No. 62/888,333, filed on Aug. 16, 2019.

(51) Int. Cl.
*G06F 9/44* (2018.01)
*G06F 8/65* (2018.01)
(Continued)

(52) U.S. Cl.
CPC .............. *G06F 8/65* (2013.01); *G06Q 10/105* (2013.01); *G06Q 20/202* (2013.01);
(Continued)

(58) Field of Classification Search
None
See application file for complete search history.

(56) References Cited

U.S. PATENT DOCUMENTS

| 7,747,995 B2 * | 6/2010 | Fritsch | H04L 67/125 |
| | | | 717/168 |
| 8,112,508 B1 * | 2/2012 | Ambrose | H04W 4/50 |
| | | | 455/418 |

(Continued)

OTHER PUBLICATIONS

International Searching Authority, International Search Report and Written Opinion for application PCT/US2020/046583, dated Nov. 25, 2020, 14 pgs.

*Primary Examiner* — Anna C Deng
(74) *Attorney, Agent, or Firm* — Morgan, Lewis & Bockius LLP

(57) ABSTRACT

Systems and methods for deploying enterprise software updates are provided. At a server storing applications and a record of client devices is provided. Each application includes a corresponding group identifier indicating a group associated with an application and a corresponding version identifier indicating a version of the application. The record includes the deployment identifier for each application in the plurality of applications installed on each device. A first application having a first group identifier and a first version identifier, and a second application having the first group identifier and a second version identifier is installed in each respective device. An update for the first application is received at the server, which includes modifying the version identifier of the first application. The update for the first application is communicated to each device. For each respective device, a modification of the deployment identifier indicates which application is executable on the respective device.

20 Claims, 9 Drawing Sheets

500

(502) Obtaining from the server, in response to a command to run a first application on the client device, via the communication network, an identity of an application in an application group that is designated active. The application group includes the first application and only one application in the application group is designated active at any given time.

↓

(504) Continuing to run the first application on the client device in response to a determination that an identity of the first application matches the identity of the single application in the application group that is designated active.

↓

(506) Running a procedure, in response to a determination that an identity of a second application in the application group matches the identity of the single application in the application group that is designated active. The procedure includes terminating the first application. The procedure further includes executing the second application, where the executing retrieves all or a portion of the shared data element stored on the client device, thereby allowing an application with an active status to run while preserving shared data associated with an inactive application.

(51) Int. Cl.
*G06Q 20/20* (2012.01)
*G06Q 30/018* (2023.01)
*G06Q 10/105* (2023.01)
*H04L 67/01* (2022.01)

(52) U.S. Cl.
CPC ......... *G06Q 20/204* (2013.01); *G06Q 20/206* (2013.01); *G06Q 30/0185* (2013.01); *H04L 67/01* (2022.05)

(56) References Cited

U.S. PATENT DOCUMENTS

| | | | |
|---|---|---|---|
| 8,555,272 B2 * | 10/2013 | Wetherly | G06F 8/65 |
| | | | 717/170 |
| 9,535,685 B1 * | 1/2017 | Wang | G06F 8/61 |
| 9,727,327 B1 * | 8/2017 | Hill | H04L 67/10 |
| 10,528,479 B2 * | 1/2020 | Wang | G06F 12/1027 |
| 10,747,527 B2 * | 8/2020 | Atchison | F24F 11/52 |
| 2005/0262163 A1 | 11/2005 | Seki et al. | |
| 2007/0006222 A1 * | 1/2007 | Maier | G06F 8/61 |
| | | | 717/170 |
| 2012/0192173 A1 * | 7/2012 | Price | G06F 8/65 |
| | | | 717/172 |
| 2012/0266156 A1 * | 10/2012 | Spivak | H04L 67/34 |
| | | | 717/172 |
| 2014/0007074 A1 * | 1/2014 | Sporkert | G06F 8/658 |
| | | | 717/172 |
| 2016/0092196 A1 * | 3/2016 | Kuchibhotla | G06F 8/65 |
| | | | 717/170 |
| 2016/0294605 A1 * | 10/2016 | Searle | H04L 41/069 |
| 2017/0195459 A1 * | 7/2017 | e Costa | H04L 67/025 |
| 2019/0213004 A1 | 7/2019 | Zhu et al. | |

* cited by examiner

400

(402) A computer system for deploying an application update at a client device. The device having a display, one or more processors, and memory storing one or more programs for execution by the one or more processors, the memory further storing a first application and a second application.

(404) Receiving a command to execute the first application.

(406) Determining, in response to the receiving, a deployment identifier of the first application.

(408) Executing, response to the determining, either the first application or the second application.

(502) Obtaining from the server, in response to a command to run a first application on the client device, via the communication network, an identity of an application in an application group that is designated active. The application group includes the first application and only one application in the application group is designated active at any given time.

(504) Continuing to run the first application on the client device in response to a determination that an identity of the first application matches the identity of the single application in the application group that is designated active.

(506) Running a procedure, in response to a determination that an identity of a second application in the application group matches the identity of the single application in the application group that is designated active. The procedure includes terminating the first application. The procedure further includes executing the second application, where the executing retrieves all or a portion of the shared data element stored on the client device, thereby allowing an application with an active status to run while preserving shared data associated with an inactive application.

FIG. 5

SYSTEMS AND METHODS FOR DEPLOYING ENTERPRISE SOFTWARE UPDATES

CROSS REFERENCE TO RELATED APPLICATION

The present application claims priority to U.S. Provisional Patent Application No. 62/888,333, filed Aug. 16, 2019, entitled "Systems and Methods for Deploying Enterprise Software Updates," which is hereby incorporated by reference in its entirety.

TECHNICAL FIELD

The present disclosure generally relates to systems and methods for deploying an update. More particularly, the present disclosure relates to systems and methods designed to deploy enterprise software updates to one or more client devices.

BACKGROUND

Enterprise computer system often include a large number of client devices that run an essential application related to the business of the enterprise. If an update for the application is developed, the update is deployed to the client devices, often on a rolling basis. This deployment leads to a problem when the update includes unexpected errors, which require a further update to amend. Sometimes, such errors are critical to operations of the enterprise, such as a payment system error. The deployment of an update with such a critical error necessitates the installation of yet another update of the application in which the critical error has been resolved. However, the push of this new update of the application can take several days or weeks since the client devices are often wireless devices and the wireless network bandwidth available to the deploy the update is constrained. For instance, in the case where the client device is a point of sale (POS) device, there many dozens of POS devices at a given retail location. Rolling out the updated application to each POS device at the retail location concurrently would consume too much of the available wireless network resources. At the same time, failure to roll out the updated application, in which the critical error has been resolved, will lead to the inability to use the POS devices at the retail location.

Given the above background there is a need in the art for improved systems and methods for improved application deployment to address this dilemma.

The information disclosed in this background section is only for enhancement of understanding of the general background of the invention and should not be taken as an acknowledgement or any form of suggestion that this information forms the prior art already known to a person skilled in the art.

SUMMARY

Advantageously, the systems and methods detailed in the present disclosure address the shortcomings in the prior art detailed above.

Systems and methods for deploying enterprise software updates are provided. A server stores applications and a record of client devices. Each application includes a corresponding group identifier indicating a group associated with the application and a corresponding version identifier indicating a version of the application. The record includes the deployment identifier for each application in the plurality of applications installed on each device. A first application (e.g., a rollback version of a POS application) having a first group identifier and a first version identifier, and a second application (e.g., a newer version of the POS application) having the first group identifier and a second version identifier is installed in each respective device. If a determination is made that the newer version of the POS application is faulty, advantageously, the server can cause the client devices to execute the rollback version of the POS application even in instances where a user of a device chose to execute the newer version of the application. Moreover, in accordance with the present disclosure, because the rollback version and the newer version of the application share the same first group identifier, they are able to share memory that stores information (e.g., application state). Thus, execution of any version of the application sharing the same group identifier will resume where a prior version of the application left off because of this ability to share data.

One aspect of the present disclosure provides an application deployment system including a computer system. The computer system includes a server communicatively coupled to a communication network. The server includes an application gating data structure. A client device is communicatively coupled to the communication network. The client device includes a processor, a memory, and a software interface providing an interface between the server and the client device. The software interface is at least partially installed in the client device memory. The software interface is configured to communicate between the client device and the server through the communication network in order to transmit information between the client device and the server. The memory stores an application group including a first application and a second application. Each application is configured to run on the client device. The first and second applications are each communicatively coupled to the communication network. The first and second applications have a shared data element stored in the memory of the client device. Furthermore, the application gating data structure includes, for the application group, an active status indicator that identifies a single application in the application group as being active. The first application is configured to obtain, in response to a command to run the first application on the client device, from the interface software of the client device, via the communication network, an identity of the single application in the application group that is active. The first application continues to run the first application on the client device in response to a determination that the first application is active. The first application further runs a procedure, in response to a determination that the second application is active. The procedure includes terminating the first application. The procedure further includes executing the second application, where the executing retrieves all or a portion of the shared data element stored on the client device, thereby allowing an application with an active status to run while preserving shared data associated with an inactive application.

In some embodiments, the first and second applications further have a shared data source stored on the server.

In some embodiments, the obtaining the identity includes providing a query to the server to obtain the identity of the single application in the application group that is active.

In some embodiments, the procedure further includes modifying a graphical user interface icon associated with the first application.

In some embodiments, the client device is a mobile device.

In some embodiments, the first application and the second application are different versions of a single point of sale (POS) software application.

In some embodiments, the procedure further includes executing a procurement transaction using the second application.

In some embodiments, the shared data element includes a transaction identifier of a procurement transaction that was executed by the first application.

In some embodiments, the shared data element includes an AMEX transaction identifier, an amount, an authorization code, an AVS street match, an AVS zip code match, a settlement batch number, a billing address, a card security code match, a client IP address, a credit card expiration date, a customer code, a description of a procured item, a discount amount, a quantity, a shipping address, a shipping method, a shipping phone number, a tax amount, a tax rate, a tender type, a time stamp, or a universal pricing code for a procurement transaction that was executed by the first application.

In some embodiments, the shared data element includes an identification of an operating system version.

In some embodiments, the shared data element includes s a storage sled initialization indication, a storage sled monitoring indication, a storage sled power monitoring indication, or a storage sled status.

In some embodiments, the shared data element includes a database location, a database store type, a configuration name, a store identifier, or an employee identifier.

Yet another aspect of the present disclosure provides a method at a client device. The client device is communicatively coupled to a server by a communication network. Also, the client device includes a processor and a memory. The method includes obtaining from the server, in response to a command to run a first application on the client device, via the communication network, an identity of an application in an application group that is designated active. The application group includes the first application and only one application in the application group is designated active at any given time. The method includes continuing to run the first application on the client device in response to a determination that an identity of the first application matches the identity of the single application in the application group that is designated active. Additionally, the method includes running a procedure, in response to a determination that an identity of a second application in the application group matches the identity of the single application in the application group that is designated active. The procedure includes terminating the first application and executing the second application. The executing retrieves all or a portion of a shared data element stored on the client device. Furthermore, the shared data element is shared between the first application and the second application. This shared data element allows an application with an active status to run while preserving shared data associated with an inactive application.

In some embodiments, the obtaining the identity includes providing a query to the server to obtain the identity of the single application in the application group that is active.

In some embodiments, the procedure further includes modifying a graphical user interface icon associated with the first application.

In some embodiments, the client device is a mobile device.

In some embodiments, the first application and the second application are different versions of a single point of sale (POS) software application.

In some embodiments, the procedure further includes executing a procurement transaction using the second application.

In some embodiments, the shared data element includes a transaction identifier of a procurement transaction that was executed by the first application.

In some embodiments, the shared data element includes an AMEX transaction identifier, an amount, an authorization code, an AVS street match, an AVS zip code match, a settlement batch number, a billing address, a card security code match, a client IP address, a credit card expiration date, a customer code, a description of a procured item, a discount amount, a quantity, a shipping address, a shipping method, a shipping phone number, a tax amount, a tax rate, a tender type, a time stamp, or a universal pricing code for a procurement transaction that was executed by the first application.

In some embodiments, the corresponding shared data element for the first and second applications includes an identification of an operating system version.

In some embodiments, the corresponding shared data element for the first and second applications includes a storage sled initialization indication, a storage sled monitoring indication, a storage sled power monitoring indication, or a storage sled status.

In some embodiments, the corresponding shared data element for the first and second applications includes a database location, a database store type, a configuration name, a store identifier, or an employee identifier.

In some embodiments, the plurality of client devices includes two or more client devices, one hundred or more client devices, one thousand or more client devices, or ten thousand or more client devices.

Yet another aspect of the present disclosure provides a computer implemented method. The method includes at a server storing, in a memory of the server, a plurality of applications and a record of a plurality of client devices. Each respective application in the plurality of applications includes a corresponding group identifier indicating a group associated with the respective application and a corresponding version identifier indicating a version of the respective application. The record of the plurality client devices includes, for each respective client device in the plurality of client devices, a version identifier for each application in the plurality of applications installed on the respective client device. Furthermore, a first application in the plurality of applications has a first group identifier and a first version identifier, and a second application in the plurality of applications has the first group identifier and a second version identifier. The first and second applications are each configured to run on each respective client device in the plurality of client devices. Each respective application in the plurality of applications having a corresponding common group identifier includes a corresponding shared data element associated with the corresponding common group identifier. The method further includes receiving, at the server, an update for the first application. The update includes modifying the version identifier of the first application to indicate a version associated with the update. The method includes communicating the update for the first application to a first client device in the plurality of client devices. Furthermore, the method includes receiving, at the server, a command to modify the version identifier for a subset of applications in the plurality of applications, for each respective client device in the plurality of client devices, the modification of the version identifier indicates which application in the plurality of applications is executable on the respective client device.

In some embodiments, each application in the plurality of applications includes a corresponding deployment identifier indicating a deployment status of the respective application.

In some embodiments, the corresponding deployment identifier is selected from the group consisting of an active deployment status and an inactive deployment status.

In some embodiments, the record of the plurality of client devices further includes, for each respective client device in the plurality of client devices, a corresponding location identifier associated with the respective client device.

In some embodiments, the corresponding location identifier includes a physical address associated with the client device.

In some embodiments, each application in the plurality of applications having a corresponding common group identifier is stored, on the server, in a single corresponding container associated with the corresponding common group identifier.

In some embodiments, the update for the first application further includes modifying a graphical display icon associated with the first application.

In some embodiments, the communicating the update for the first application is in response to a request for the updated application from the first client device.

In some embodiments, the communicating the update for the first application is in response to a command provided by the server to the first client device.

In some embodiments, the communicating the update for the first application is conducted over a predetermined period of time.

In some embodiments, the communicating the update for the first application is conducted in accordance with a determination of an available bandwidth of a communication network associated with the server and one or more client devices in the plurality of client devices.

In some embodiments, the corresponding shared data element for a common group that comprises the first and second applications includes first data written by the first application and second data written by the second application.

In some embodiments, each client device in the plurality of client devices is a mobile device.

In some embodiments, the first application and the second application are different versions of a single point of sale (POS) software application.

In some embodiments, the procedure further includes executing a procurement transaction using the second application.

In some embodiments, the corresponding shared data element for the first and second applications includes a transaction identifier of a procurement transaction that was executed by the first application.

In some embodiments, the shared data element includes an AMEX transaction identifier, an amount, an authorization code, an AVS street match, an AVS zip code match, a settlement batch number, a billing address, a card security code match, a client IP address, a credit card expiration date, a customer code, a description of a procured item, a discount amount, a quantity, a shipping address, a shipping method, a shipping phone number, a tax amount, a tax rate, a tender type, a time stamp, or a universal pricing code for a procurement transaction that was executed by the first application.

In some embodiments, the shared data element includes an identification of an operating system version.

In some embodiments, the shared data element includes a storage sled initialization indication, a storage sled monitoring indication, a storage sled power monitoring indication, or a storage sled status.

In some embodiments, the shared data element includes a database location, a database store type, a configuration name, a store identifier, or an employee identifier.

Yet another aspect of the present disclosure provides a computer implemented method. The method includes, at a device having a display, one or more processors, and memory storing one or more programs for execution by the one or more processors, the memory further storing a first application and a second application. The one or more programs includes instructions for receiving a command to execute the first application. The one or more programs further include instructions for determining, in response to the receiving, a deployment identifier of the first application. In some instances, this deployment identifier is either "an active deployment status" or "an inactive deployment status" indication. In response to this determination, either the first or second application is executed. For instance, the first application is executed, instead of the second application, in accordance with a determination that the deployment identifier of the first application is the active deployment status. The second application is executed, instead of the first application, in accordance with a determination that the deployment identifier of the first application is the inactive deployment status.

In some embodiments, the command of the receiving is provided by a user of the device.

In some embodiments, the prior to the executing, in accordance with a determination that the deployment identifier of the first application is the inactive deployment status, the method further includes displaying, on the display, a prompt to execute the second application.

In some embodiments, the in accordance with a determination the first application is executed, the second application is placed in a disabled state, and in accordance with a determination the second application is executed, the first application is placed in a disabled state.

In accordance with an aspect of the present disclosure, the above and other objects can be accomplished by the provision of an application update deployment service, which provides a mechanism to selectively deploy and/or execute an application on a respective client device.

The methods and apparatuses of the present disclosure have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 provides a flow chart of processes and features of a computer system for deploying an application, in accordance with an exemplary embodiment of the present disclosure;

FIG. 5 provides a flow chart of methods for utilizing applications at a client device, in accordance with an exemplary embodiment of the present disclosure;

Figure 1:
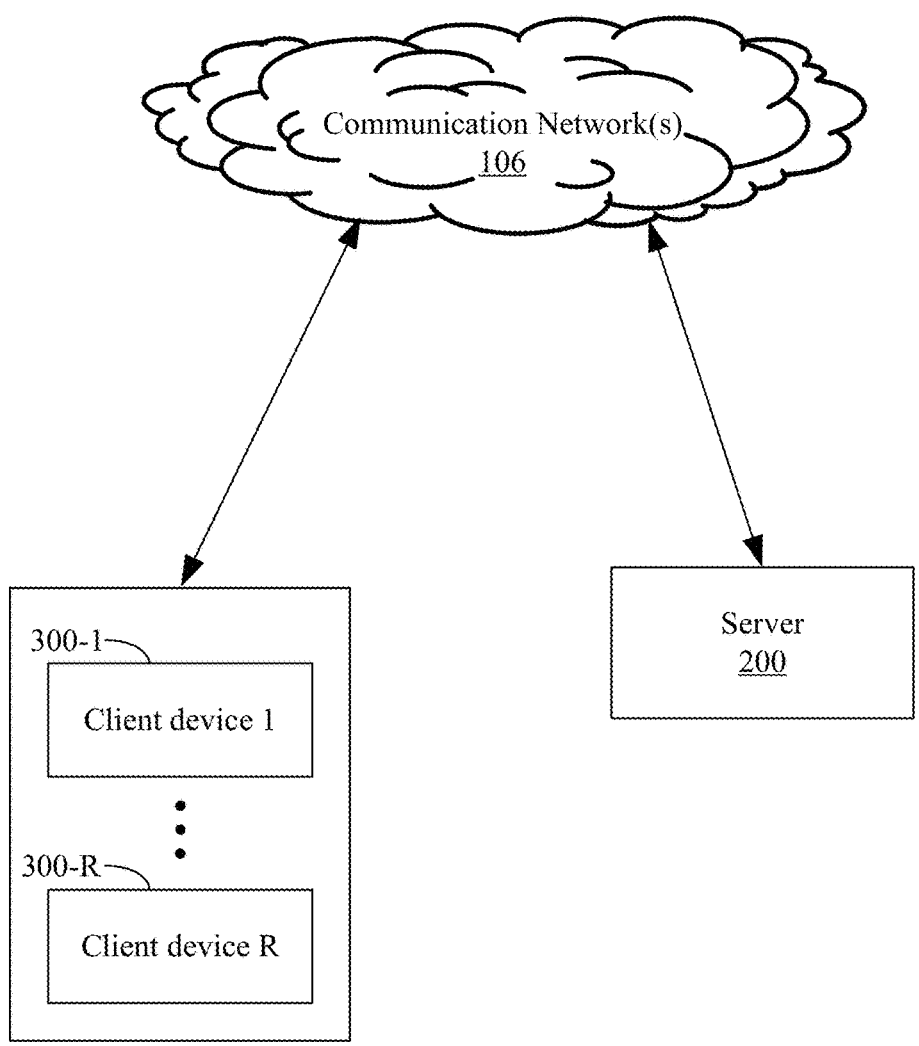
FIG. 1 illustrates an exemplary system topology including application deployment system, in accordance with an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

If an update to an application that includes an unexpected error is pushed to a client device, the client device may become inoperable due to the error. For instance, if the application is a payment system application, the client device will no longer be able to processes payments since the application fails to operate as anticipated. Rolling back to a previous version of the application not only consumes time and network bandwidth, but also consumes time when the client device and the application would otherwise be operable. Furthermore, the rollback often reverts to previous states of data, preventing current data of the updated application from being used on the rolled back version of the application.

To address this, the systems and methods of the present disclosure provide an application update deployment service. This service evaluates a deployment status of an application, allowing the client device to select which application to execute depending on the status of the application. This allows a previous or different version of the application to be instantly deploy in a situation where the updated application includes an expected or critical error, allowing operations of the application and client device to continue seamlessly. Furthermore, the present disclosure allows for different versions of the application to share data, reducing both network bandwidth and end-user bandwidth of the client device, while also preventing loss of data should an application no longer function.

Reference will now be made in detail to various embodiments of the present disclosure, examples of which are illustrated in the accompanying drawing and described below. While the disclosure will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the present invention as defined by the appended claims.

It will also be understood that, although the terms first, second, etc. may be used herein to describe various elements, these elements should not be limited by these terms. These terms are only used to distinguish one element from another. For example, a first application could be termed a second application, and, similarly, a second application could be termed a first application, without departing from the scope of the present disclosure. The first application and the second application are both applications, but they are not the same application.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and or "comprising," when used in this specification, specify the presence of stated features, integers, steps, operations, elements, and or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "dynamically" means an ability to update a program while the program is currently running.

As used herein, the term "executable" and "deployable" are used interchangeable herein unless expressly stated otherwise.

Additionally, the terms "client," "subject," and "user" are used interchangeably herein unless expressly stated otherwise.

Furthermore, when a reference number is given an "$i^{th}$" denotation, the reference number refers to a generic component, set, or embodiment. For instance, an application termed "application i" refers to the $i^{th}$ application in a plurality of applications.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

Some portions of this detailed description describe the embodiments of the invention in terms of application updates and symbolic representations of operations on information. These application update descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

An aspect of the present disclosure is directed to providing an enterprise software (e.g., application) deployment service. Systems and methods for providing an enterprise software deployment service are provided. The systems and methods include a server having a memory. The memory stores two or more applications and a record of a plurality of client devices. Each application includes a corresponding group identifier that indicates a group associated with the application and a corresponding version identifier indicating a version of the application. For each client device, the record includes the deployment identifier for each application in the plurality of applications installed on the client device. A first application has a first group identifier and a first version identifier, and a second application have the first group identifier and a second version identifier. Both applications are installed in each respective device. An update for the first application is received at the server. The update includes modifying the version identifier of the first application. The update for the first application is communicated to each client device. For each respective client device, the update includes a modification of the deployment identifier indicating which application is executable on the respective device.

FIG. 1 illustrates an exemplary topography of an integrated system 100 for providing a deployment of an application update. The integrated system 100 includes a server 200 that stores one or more applications (e.g., first application 216-1 of FIG. 2) and a record of a plurality of client devices (e.g., client device record store 206), and one or more client devices 300 (e.g., computing device 300-1 of FIG. 3) that receive communications related to an application 216, such as executing an application 216 and receiving updates to the application 216 from the integrated system 100. In some embodiments, each client device 300 is associated with at least one user (e.g., a first client device 300-1 is associated with a first user, a second client device 300-2 is associated with a second user, etc.). However, the present disclosure is not limited thereto.

Figure 2:
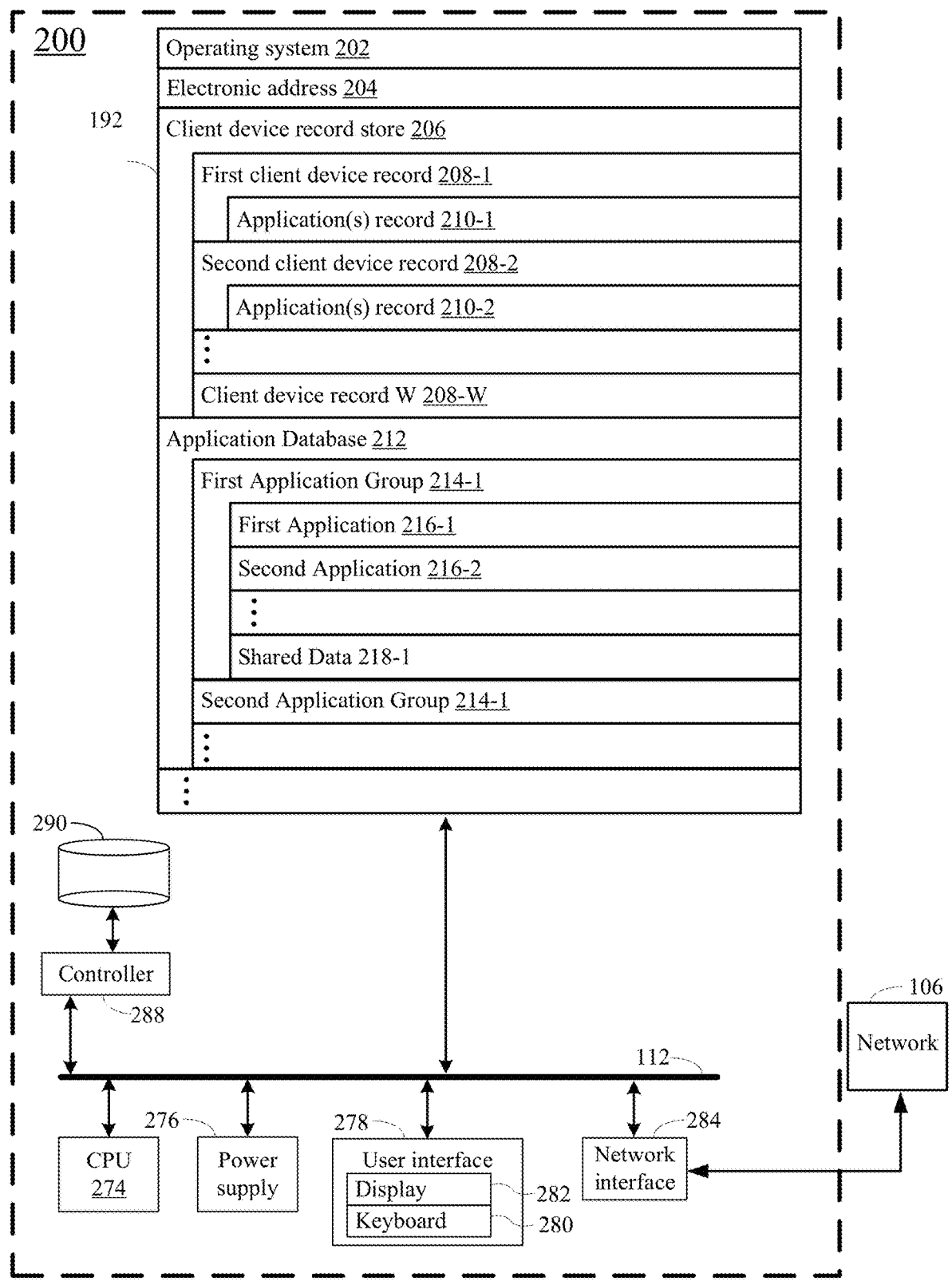
FIG. 2 illustrates various modules and/or components of an application deployment, in accordance with an exemplary embodiment of the present disclosure.
Figure 3:
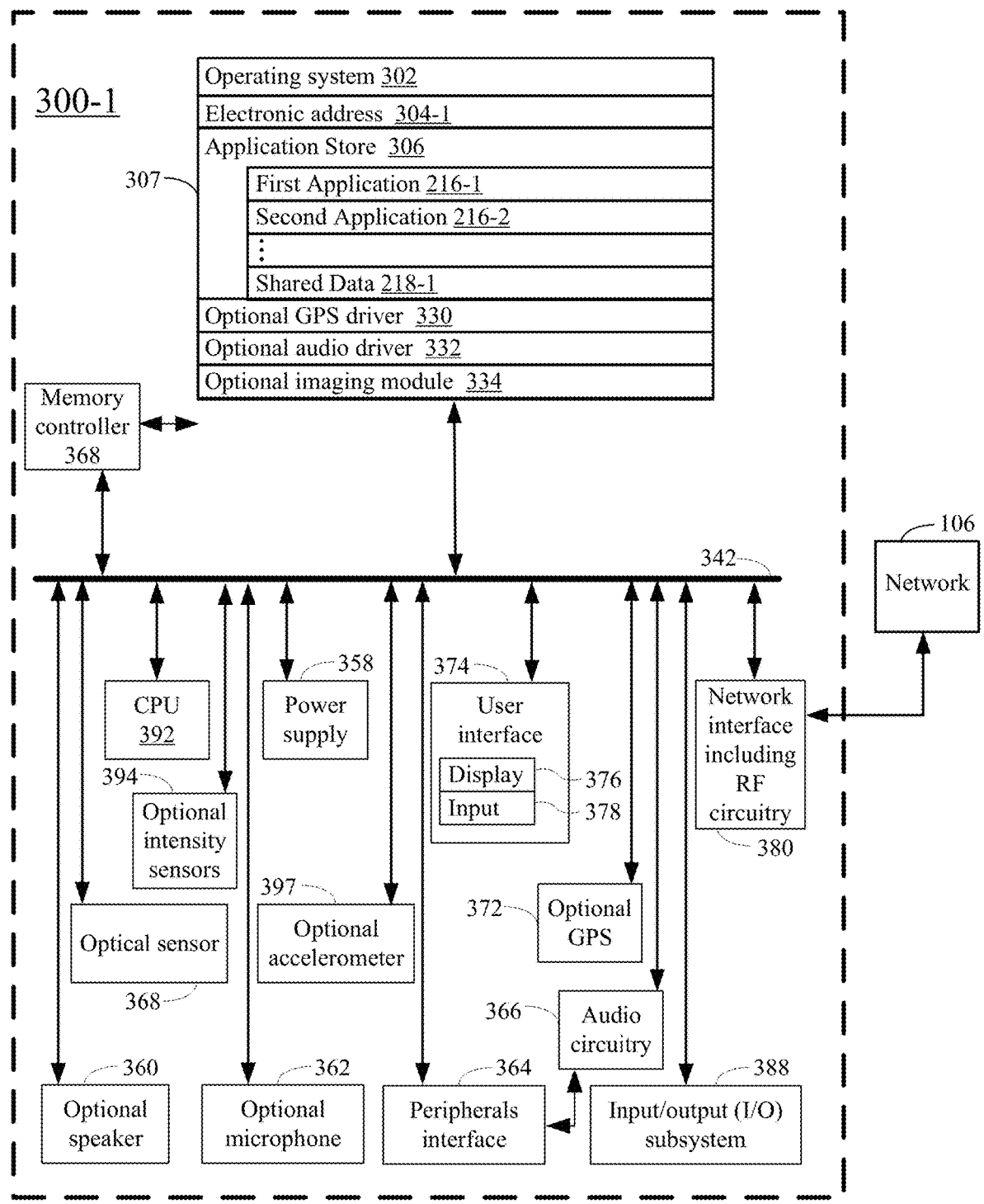
FIG. 3 illustrates various modules and/or components of a client device, in accordance with an exemplary embodiment of the present disclosure.

A detailed description of a system 100 for providing a deployment of an application update service in accordance with the present disclosure is described in conjunction with FIG. 1 through FIG. 3. As such, FIG. 1 through FIG. 3 collectively illustrate an exemplary topology of the system 100 in accordance with the present disclosure. In the topology, there is a server 200 for receiving an update to an application and communicating data related to the application to one or more client devices 300.

Referring to FIG. 1, the server 200 is configured to store one or more applications (e.g., a first application 216-1, a second application 216-2, etc.), and a record of each client device 300 (e.g., client device record store 206 of FIG. 2). The server 200 receives an update to an application 216 in the one or more applications 216 and deploys the update to one or more client devices 300 associated with a corresponding user. The one or more applications 216 are provided in electronic form to each client device 300. As such, the server 200 can push an application 216 onto a respective client device 300, allowing the server to install an update for the application 216 and/or remove data associated with the application 216

In some embodiments, the server 200 receives the data wirelessly through radio-frequency (RF) signals. In some embodiments, such signals are in accordance with an 802.11 (Wi-Fi), Bluetooth, or ZigBee standard.

In some embodiments, the server 200 is not proximate to the user and/or does not have wireless capabilities or such wireless capabilities are not used for the purpose of acquiring an update for an application 216. In such embodiments, a communication network 106 is utilized to communicate an update from a source (e.g., a remote client device 300) to the server 200.

Examples of networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

Of course, other topologies of the system 100 other than the one depicted in FIG. 1 are possible. For instance, in some embodiments, rather than relying on a communication network 106, the server 200 wirelessly transmit information directly to the client devices 300. Further, in some embodiments, the server 200 constitutes a portable electronic device, a server computer, or in fact constitute several computers that are linked together in a network, or be a virtual machine and/or a container in a cloud-computing context. As such, the exemplary topology shown in FIG. 1 merely serves to describe the features of an embodiment of the present disclosure in a manner that will be readily understood to one of skill in the art.

Turning to FIG. 2 with the foregoing in mind, in some embodiments, the server 200 includes one or more computers. For purposes of illustration in FIG. 2, server 200 is represented as a single computer that includes all of the functionality for providing an application update deployment system. However, the present disclosure is not limited thereto. In some embodiments, the functionality for providing a server 200 is spread across any number of networked computers, and/or resides on each of several networked computers, and/or is hosted on one or more virtual machines and/or one or more containers at a remote location accessible across the communication network 106. One of skill in the art will appreciate that any of a wide array of different computer topologies are used for the application and all such topologies are within the scope of the present disclosure.

An exemplary server 200 for providing deployment of an application update is provided. The server 200 includes one or more processing units (CPU's) 274, a network or other communications interface 284, a memory 192 (e.g., random access memory), one or more magnetic disk storage and or persistent devices 290 optionally accessed by one or more controllers 288, one or more communication busses 112 for interconnecting the aforementioned components, a user interface 278, the user interface 278 including a display 282 and input 280 (e.g., keyboard, keypad, touch screen), and a power supply 276 for powering the aforementioned components. In some embodiments, data in memory 192 is seamlessly shared with non-volatile memory 290 using known computing techniques such as caching. In some embodiments, memory 192 and or memory 290 includes mass storage that is remotely located with respect to the central processing unit(s) 274. In other words, some data stored in memory 192 and/or memory 290 may in fact be hosted on computers that are external to the server 200 but that can be electronically accessed by the server 200 over an Internet, intranet, or other form of network or electronic cable (illustrated as element 106 in FIG. 2) using network interface 284.

In some embodiments, the memory 192 of the server 200 for deploying an application update stores:

an operating system 202 that includes procedures for handling various basic system services;
an electronic address 204 that identifies the server 200;
a client device record store 206 that stores a plurality of client device records 208, with each client device record 208 including an application record 210 describing information related to one or more applications (e.g., first application 216-1 of FIG. 7A) installed on a corresponding client device (e.g., client device 300 of FIG. 3); and
an application database 212 storing one or more application groups 214, each application group 214 including one or more applications 216 that have a shared data element 218 available to each application 216 in the same application group 214.

The client device record store 206 includes data associated with each client device 300, such as a respective client device record 208 associated with a corresponding client device 300 (e.g., first client device record 208-1 is associated with first client device 300-1). In some embodiments, the data in each respective client device record 208 information related to a respective status of a corresponding application 216, such as an applications(s) record 210, hereinafter "application record." This application record includes one or more identifiers associated with the corresponding application 216. Each identifier in the one or more identifier that dictate how the corresponding application operates on a client device 300. For instance, in some embodiments, the application record 210 includes a version identifier that indicates a version of a respective application (e.g., client device 300-1 includes first application 216-1 of version X and second application 216-2 of version Y). In some embodiments, the application record 210 includes a deployment identifier that indicates if an application 216 is executed (i.e., launched, opened, etc.) in response to a command to execute the application 216.

In some embodiments, the data of the client device record 206 includes a deployment identifier that indicates a deployment status of the respective application 216 (e.g., first application 216-1 of version identifier X is an active deployment status, second application 216-2 of version identifier Y is an inactive deployment status). Furthermore, in some embodiments, the deployment identifier and the version identifier are subsumed as a collective identifier, which indicates both a version and a deployment status of the respective application 216. In some embodiments, the deployment identifier, the version identifier, or both are unique to the respective application 216 (e.g., each first application 216-1 installed on a respective client device 300 includes a first version identifier and a first deployment identifier) or the respective client device 300 (e.g., a first application 216-1 installed on a first client device 300-1 includes a first version identifier and a first deployment identifier, the first application 216-1 installed on a second client device 300-2 includes a second version identifier and a second deployment identifier, etc.)

In some embodiments, the version identifier and/or the deployment identifier is associated with a graphical icon (e.g., graphical icons 600 of FIG. 7A), which modifies a characteristic of the application 216. In some embodiments, each respective version identifier is associated with a unique graphical icon 600, allowing for a user to readily identifier a version identifier by visualizing the graphical icon 600 on a client device 300. For instance, referring briefly to FIGS. 6A through 6C, a first application 216-1 includes a third graphical icon 600-3 indicating a corresponding "Blue" version identifier and a second application 216-2 includes a fourth graphical icon 600-4 indicating a corresponding "Green" version identifier. Each of the blue and green identifiers indicate a corresponding unique executable version identifier of a corresponding application 216, such as a first "blue" version identifier of a point of sales platform application 216 and a second "green" version identifier of the point of sales platform 216.

Moreover, in some embodiments, the data of the client device record store 208 includes a location identifier that identifiers a location associated with the client device 300. In some embodiments, the location includes a physical address associated with the client device 300 (e.g., client device 300-1 is associated with a first physical address, client device 300-2 is associated with the first physical address, client device 300-3 is associated with a second physical address, etc.), an electronic address associated with the client device 300. Having the location identifier allows a user of the present disclosure to deploy a first application for one or more client devices 300 associated with a first location while deploying a second application for one or more client devices associated with a second location. This is particularly useful if an application is an experimental application, allowing only a subset of client devices to execute the experimental application. In some embodiments, the location identifier includes one or more subsets of location identifiers, such as a category of client device 300 at a respective location (e.g., a first subset of location identifiers associated with a first type of client devices 300 configured as point of sales device, a second subset of location identifiers associated with a second type of client devices 300 configured as a customer kiosk device, etc.).

In some embodiments, the client device record 208 includes data associated with each end-user that is further associated with the corresponding client device 300. For instance, in some embodiments, the client device record store 208 includes a listing of users that operated the corresponding client device 300. For instance, a listing of consumers operating a kiosk client device 300, a listing of employees operating a dedicated POS client device 300, the consumer operating a smart POS client device, and the like.

In some embodiments, the application(s) record 210, hereinafter "application record 210," stores data related to a history of applications 216 associated with a corresponding client device 208, such as a listing of applications historically (e.g., previously and/or presently) installed on a corresponding client device 300. As a non-limiting example, the listing of applications can include a record of each version of a corresponding application installed on the corresponding client device 300, and, optionally, information associated with each version. For instance, in some embodiments, the application record 210 includes information associated with a date of installation and/or uninstall of one or more versions of an application 216, a date of access to one or more versions of the application 216, and the like. In some embodiments, the application record 210 includes a listing of configurations associated with the application 216, such as read, write, and copy privileges; network 106 communications privileges; and the like.

In some embodiments, the application record 210 allows for remote configuration of one or more applications 216 associated with a client device 300, such as remote installation and/or updating of a respective application 216 on the client device 300. In this way, the server 20 can retain information associated with one or more applications 216 further associated with a corresponding client device 300, while also allowing for remote operation of the corresponding client device 300. From this, when an error occurs are the corresponding client device 300 while updating the respective application 300, the server 200 can evaluate the corresponding application record 210 and affirmative solve the error for the corresponding client device, such as instructing the client device 300 to execute a second application 216-2.

Additionally, the client device record store 206 allows a user of the present disclosure unassociated with each individual respective client device 300 to determine various device configurations and states without having direct access to the client device 300 (e.g., having the physical client device 300, accessing the client device 300 using a virtual computer, etc.). Furthermore, by providing access to information that collectively represents a plurality of client devices 300, the user can analyzes errors within the system (e.g., an first error associated with server 200, a second error associated with client device 300, a third error associated with first application 216-1, etc.) without having to individually analyze each component of the system.

Furthermore, the server 200 includes the application database 212 that stores data associated with one or more application groups 214. In some embodiments, each respective application group 214 includes one or more corresponding applications 216, which allows for providing a group identifier for each of the one or more corresponding applications 216. Through this application group 214 identifier, the shared data element 218 is available between the one or more associated applications 216 (e.g., transaction data 620 of FIG. 7B, transaction data 620 of FIG. 7C). For instance, in some embodiments, a respective application group 214 forms a grouping of one or more distinct applications 216 that have a collective set of shared data elements 218, such as a first application 216-1 configured as a catalog of products including a corresponding price for each respective product in the catalog of products and a second application 216-2 configured as POS application that retrieves the corresponding price based on a barcode associated with each respective product (i.e., the first and second applications have shared product and price data 218). Even though the one or more applications 216 can be installed one different client devices 300, the one or more applications remain associated with the application group 216 through the group identifier associated with each application 216 of the applications group 214. However, the present disclosure is not limited thereto.

In some embodiments, a respective application group 214 includes a grouping of one or more versions of a corresponding application 216, such as a first version of first application 216-1 and a second version of a second application 216-2. For instance, in some embodiments, each application 214 includes a version identifier that indicates an order of publication of a corresponding application (e.g., a first application 216-1 includes a first version identifier, a second application 216-2 includes a second version identifier, etc.). In some embodiments, the order of publication includes write only privileges, preventing a user of the system 200 from modifying the version identifier of the application 216. However, the present disclosure is not limited thereto.

For instance, in some embodiments, the version identifier indicates if a corresponding application 216 is executable on a client device 300. As a non-limiting example, in some embodiments, the version identifier indicates a binary yes or no if the corresponding application 216 is executable. In some embodiments, a first version identifier indicates if the corresponding application 216 is executable, and, in accordance with a determination that the corresponding application 216 cannot be executed based on the version identifier, further indicating a second application 216-2 having a In some embodiments, the first application 216-1 is data that is unique to the corresponding first version of the application 216-1, and the second application 216-1 is data that is unique to the corresponding second version of the application 216-2. From this, in some embodiments, the shared data element 218 includes various data that is utilized by both the first application 216-1 and the second applications 216-2, or another application 216 in the corresponding application group 214. In some embodiments, a respective application group 214 is manually configured by a user of the server (e.g., a user assigns a first application 216-1 to a first application group 214-1 through a group identifier associated with the first application group 214-1). However, the present disclosure is not limited thereto. In other embodiments, the server 200 detects a characteristic associated with a respective application 216 (e.g., a name of an application 216, a version identifier of an application 216, a source of an application 216, etc.) in order to place the application 216 in a respective application group 214.

In some embodiments, the shared data element 218 includes data created by either the first application 216-1 and the second application 216-2. For instance, in some embodiments, the first application 216-1 forms a first data associated with a first user interaction locally at a first client device 300-1 (e.g., a first transaction data is created at the first client device 300) and the second application 216-2 forms a second data associated with a second user interaction at a second client device 300-2 (e.g., a second transaction data is created at the second client device 300). This first data and second data are then communicated to server 200 and collectively stored as shared data element 218, which is then read by the first application 216-1 and the second application 216-2, allowing for the first client device 300-1 and the second client device 300-1 to access both of the first data and the second data. However, the present disclosure is not limited thereto. As another example, in some embodiments, a first transaction data is created at the first client device 300 using a first application 216-1 and the first transaction data is communicated to the server 200, such that the first transaction data is retained through the shared data element 218 of the a corresponding group application 214. In this way, a second client device 300-2 of the corresponding group application 214 utilizing a second application 216-2 can access the first transaction data through the shared data element 218. Moreover, the first client device 300-1 can also access the first transaction data through the shared data element 218 using the second application 216-2 at the first client device 300-1.

In some embodiments, the shared data element 218 includes one or more client device 300 configurations, such as one or more user settings at a client device 300, one or more application 216 settings at the client device 300, and the like. In some embodiments, the shared data element includes non-essential data to execute an application 216. As a non-limiting example, in some embodiments, a first application 216-1 includes a virtual machine and/or a container, such that data created by the first application 216-1 is retained at the server 200 and accessible by a second application 216-2 accessible outside of a virtual environment provided by the first application 216-1. However, the present disclosure is not limited thereto.

For instance, in some embodiments, the shared data element 218 includes essential data required to execute and/or utilize each application 216 in a corresponding application group 214. As a non-limiting example, consider a first application 216-1 (e.g., "Blue Application" 216-1 of FIGS. 6A and/or 6B) and a second application 216-2 (e.g., "Green Application" of FIGS. 6A and/or 6C) that each provide a point of sales platform (e.g., different versions of a sales platform in a corresponding application group 214 associated with the sales platform). Each respective application 216 in the application group 214, as the point of sales platform requires, an ability to read and/or write transaction data (e.g., shared data element 218-1 of FIG. 7B) on a table stored at a corresponding client device 300 running the first application 216 and/or the server 200, such that multiple devices can perform transactions and provide transaction data. As such, a shared data element 218 for the corresponding application group 214 includes the table having the transaction data, which is accessible to each application 214 in the corresponding application group 214. In this way, the if either of the first application 216-1 or the second application 216-2 is inoperable at a client device 300, the sales platform is still operable through use of the other, operation, application 216.

In some embodiments, one or more of the above identified data stores and/or modules of the server 200 are stored in one or more of the previously described memory devices (e.g., memory 192 and/or memory 290), and correspond to a set of instructions for performing a function described above. The above-identified data, modules, or programs (e.g., sets of instructions) need not be implemented as separate software programs, procedures, or modules. Thus, various subsets of these modules may be combined or otherwise re-arranged in various implementations. In some implementations, the memory 192 and/or memory 290 optionally stores a subset of the modules and data structures identified above. Furthermore, in some embodiments the memory 192 and/or memory 290 stores additional modules and data structures not described above.

Referring to FIG. 3, a description of an exemplary client device 300 that can be used with the presently disclosure is provided. In some embodiments, a client device 300 includes a smart phone (e.g., an iPhone, an Android device, etc.), a laptop computer, a tablet computer, a desktop computer, a wearable device (e.g., a smart watch, a heads-up display (HUD) device, etc.), a television (e.g., a smart television), or another form of electronic device such as a gaming console, a stand-alone device, and the like. In some embodiments, a client device 300 includes a point-of-sales device (e.g., a near-field communication mechanism, etc.).

The client device 300 illustrated in FIG. 3 has one or more processing units (CPU's) 392, peripherals interface 364, memory controller 368, a network or other communications interface 380, a memory 307 (e.g., random access memory), a user interface 374, the user interface 374 including a display 376 and input 378 (e.g., keyboard, keypad, touch screen, etc.), an optional accelerometer 397, an optional GPS 372, optional audio circuitry 366, an optional speaker 360, an optional microphone 362, one or more optional intensity sensors 394, an optional input/output (I/O) subsystem 388, one or more optional optical sensors 368, one or more communication busses 342 for interconnecting the aforementioned components, and a power supply 358 for powering the aforementioned components.

In some embodiments, the input 378 is a touch-sensitive display 376, such as a touch-sensitive surface. In some embodiments, the user interface 374 includes one or more soft keyboard embodiments (e.g., input 378). In some embodiments, the soft keyboard embodiments include standard (QWERTY) and or non-standard configurations of symbols on the displayed icons. The input 378 and/or the user interface 374 is utilized by an end-user of the respective client device 300 (e.g., a respective subject) to input various commands (e.g., a push command) to the respective client device.

The client device 300 illustrated in FIG. 3 optionally includes, in addition to accelerometer(s) 397, a magnetometer, and a global positioning system (GPS) 372 (or GLONASS or other global navigation system) receiver for obtaining information concerning a current location (e.g., a latitude, a longitude, an elevation, etc.) and/or an orientation (e.g., a portrait or a landscape orientation of the device) of the client device 300.

It should be appreciated that the client device 300 illustrated in FIG. 3 is only one example of a multifunction device that may be used for receiving application updates and executing an update. Thus, the client device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Memory 307 of the client device 300 illustrated in FIG. 3 optionally includes high-speed random access memory and optionally also includes non-volatile memory, such as one or more magnetic disk storage devices, flash memory devices, or other non-volatile solid-state memory devices. Access to memory 307 by other components of the client device 300, such as CPU(s) 392 is, optionally, controlled by the memory controller 368.

In some embodiments, the peripherals interface 364 couples input and output peripherals of the device to the CPU(s) 392 and the memory 307. The one or more CPU(s) 392 run or execute various software programs and/or sets of instructions stored in the memory 307, such as the application store 306, to perform various functions for the client device 300 and process data. In some embodiments, peripherals interface 346 is configured to couple with a point-of-sales device.

In some embodiments, the peripherals interface 364, the CPU(s) 392, and the memory controller 368 are implemented on a single chip. In some other embodiments, the peripherals interface 364, the CPU(s) 392, and the memory controller 368 are implemented on separate chips.

RF (radio frequency) circuitry of network interface 380 receives and sends RF signals, also called electromagnetic signals. In some embodiments, the data constructs are received using the present RF circuitry from one or more devices such as client device 300 associated with a subject. In some embodiments, the RF circuitry 380 converts electrical signals to from electromagnetic signals and communicates with communication networks (e.g., communication network 106 of FIG. 1) and other communications devices, client devices 300, and/or the server 200 via the electromagnetic signals. The RF circuitry 380 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 380 optionally communicates with the communication network 106. In some embodiments, the circuitry 380 does not include RF circuitry and, in fact, is connected to the communication network 106 through one or more hard wires (e.g., an optical cable, a coaxial cable, or the like).

In some embodiments, the audio circuitry 366, the optional speaker 360, and the optional microphone 362 provide an audio interface between the user and the client device 300, enabling the client device to provide communications including audio data provided through the audio circuitry 366, the optional speaker 360, and/or the optional microphone 362. The audio circuitry 366 receives audio data from the peripherals interface 364, converts the audio data to electrical signals, and transmits the electrical signals to the speaker 360. The speaker 360 converts the electrical signals to human-audible sound waves. The audio circuitry 366 also receives electrical signals converted by the microphone 362 from sound waves. The audio circuitry 366 converts the electrical signal to audio data and transmits the audio data to peripherals interface 364 for processing. Audio data is, optionally, retrieved from and or transmitted to the memory 307 and or the RF circuitry 380 by the peripherals interface 364.

In some embodiments, the power supply 358 optionally includes a power management system, one or more power sources (e.g., one or more batteries, alternating current (AC)), a recharging system, a power failure detection circuit, a power converter or inverter, a power status indicator (e.g., a light-emitting diode (LED)) and any other components associated with the generation, management, and distribution of power in portable devices.

In some embodiments, the client device 300 optionally also includes one or more optical sensors 368. The optical sensor(s) 368 optionally include charge-coupled device (CCD) or complementary metal-oxide semiconductor (CMOS) phototransistors. The optical sensor(s) 368 receive light from the environment, projected through one or more lens, and converts the light to data representing an image. The optical sensor(s) 368 optionally capture still images and or video. In some embodiments, an optical sensor is disposed on a back end portion of the client device 300 (e.g., opposite the display 376 on a front end portion of the client device 300) so that the input 378 is enabled for use as a viewfinder for still and or video image acquisition. In some embodiments, another optical sensor 368 is located on the front end portion of the client device 300 so that an image of the user is obtained (e.g., to capture a user profile image).

In some embodiments, the memory 307 of the client device 300 stores:

- an operating system 302 that includes procedures for handling various basic system services;
- an electronic address 304 associated with the client device 300;
- an application store 306 storing one or more applications 216 and shared data element 218 that is accessible to each of the one or more applications 216;
- a GPS driver 330 that provides a current location of the client device 300;
- an audio driver 332 that provides audible sounds through the client device 300; and
- an imaging module 334 that provides image and video capture capabilities.

As illustrated in FIG. 3, a client device 300 preferably includes an operating system 302 that includes procedures for handling various basic system services. The operating system 302 (e.g., iOS, ANDROID, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components.

An electronic address 304 is associated with each client device 300, which is utilized to at least uniquely identify the client device 300 from other devices and components of the integrated system 100 (e.g., identify a respective client device 300 in a corresponding client device record 208 of FIG. 2). In some embodiments, the client device 300 includes a serial number, and optionally, a model number or manufacturer information that further identifies the device 300. In some embodiments, the electronic address 304 associated with the client device 300 is used to provide a source of a data received from and/or provided to the client device 300. For instance, in some embodiments, the electronic address 304 is utilized to identify a source of data within the shared data element 218 of a respective application group 214.

The application store 306 includes data for one or more applications 216 (e.g., first application 216-1 of FIG. 7A, second application 216-2 of FIG. 7A, first application 216-1 of FIG. 7B, etc.) and shared data element 218 that is accessible to each applications 216 in the same application group 214. In some embodiments, the application store 306 provides a virtual environment for executing the one or more applications 216. However, the present disclosure is not limited thereto. For instance, in some embodiments, the application store 306 corresponds to a respective application group 214 at a server 200. In other embodiments, the application store 302 includes data for a plurality of applications 214 that collectively belong to two or more application groups 214. In this way, the application store 306 can form a first shared data element 218-1 associated with each application 216 in a first application group 214-1 in the two or more application groups 214 and a second shared data element for use with each application 216 in a second application group 214-2 in the two or more application groups 214.

Having the shared data element 218 accessible to each application 216 of the same application group 214 allows a first application 216-1 to preserve data of a second application 216-2 if an update for the second application 216-2 includes an error or is otherwise unable to deploy at a client device 300. By doing so, the present disclosure saves time that is otherwise consumed having to update the first application 216-1 at the client device 300.

In some embodiments, the client device 300 includes a GPS driver 330. The GPS driver 330 utilizes data from the GPS 372 providing a current location of the client device 300. In some embodiments, the current location of the client device 300 includes one or more GPS coordinates of the client device 300 (e.g., a latitude coordinate and/or a longitude coordinate), an elevation coordinate of the client device, a tolerance of the current location (e.g., within a range of ±65 seconds of a provided GPS coordinate), data associated with the location identifier of the respective client device 300, or a combination thereof.

In some embodiments, the client device 300 has any or all of the circuitry, hardware components, and software components found in the system depicted in FIG. 3. In the interest of brevity and clarity, only a few of the possible components of the client device 300 are shown to better emphasize the additional software modules that are installed on the client device.

Now that details of an integrated system 100 for providing an application update deployment system have been disclosed, details regarding a flow chart of processes and features for implementing a method 400 of the system 100, in accordance with an embodiment of the present disclosure, are disclosed with reference to FIG. 4.

Block 402. Referring to block 402 of FIG. 4, a computer system (e.g., system 100 of FIG. 1) for deploying an application (e.g., application 216-2 of FIG. 2, application 216-1 of FIG. 7A, application 216-2 of FIG. 7C, etc.) update is provided. The computer system includes a client device (e.g., client device 300 of FIG. 3, client device 300-1 of FIG. 7A, client device 300-1 of FIG. 7C, etc.) having a display (e.g., display 376 of FIG. 3), one or more processors (e.g., CPU 392 of FIG. 3) and a memory (e.g., memory 307 of FIG. 3) for executing one or more programs (e.g., client application 216-2 of FIG. 7A). The memory 307 includes a first application 216-1 (e.g., application 216-1 of FIG. 7A) and a second application 216-2 (e.g., application 216-2 of FIG. 7A). The one or more programs include non-transitory instructions which, when executed by the one or more processors, perform a method 400.

In some embodiments, the first application 216-1 and the second application 216-2 are associated with the same application group 214. For instance, in some embodiments, the first application 216-1 and the second application 216-2 each include a group identifier associated with a corresponding application group 214. Each application group 214 includes a corresponding shared data element 218 that is accessible by each application 216 in the respective application group 214. In some embodiments, each application includes read, write, copy, or a combination thereof to the shared data element 218. In some embodiments, the combination thereof of privileges is determined based on an evaluation of a respective version identifier associated with the corresponding application 216. In some embodiments, the shared data element 218 is stored on the client device 300, on the server 200 (e.g., within a container), or a combination thereof. In some embodiments, the first application 216-1 and the second application 216-2 communicate through the communication network 106. Furthermore, in some embodiments, the system 100 provides a software interface, which provides an interface for communication between the server 200 and the respective client device 300. This software interface is at least partially installed in the memory 307 of the respective client device 300, allowing the client device and the server 200 to communicate with each other and transmit information there between (e.g., shared data element 218, group identifier (e.g., application group 214) of a respective application 216, version identifier of the respective application 216, etc.). Accordingly, if an application (e.g., first application 216-1) is deployed that includes a critical error, the shared data element 218 allows the client device 300 to revert to a different version of the application (e.g., a second application 216-2).

In some embodiments, the server 200 includes an application gating data structure. This application gating data structure includes, for each application group 214, an active status indicator that identifies one application in the application as being active.

In some embodiments, the method includes receiving an update for a first application 216-1. In some embodiments, the update for the first application 216-1 includes modifying an identifier associated with the application, such as a version identifier and/or a deployment status identifier. Accordingly, in some embodiments the client device 300 communicates a request to the server 200 for the updated for the first application 216-1 (e.g., the client device pulls the update from the server). In some embodiments, the server 300 communicates the updated for the first application 216-1 to one or more client devices 300 (e.g., the server pushes the update to the one or more client devices 300).

Furthermore, in some embodiments, the receiving the update is conducted at a predetermined period of time. In some embodiments, the predetermined period of time is a function of a time of day (e.g., the receiving the update is conducted outside of regular business hours, at night time, etc.), a function of a bandwidth of the communication network 106 (e.g., in accordance with a determination a bandwidth of the communication network satisfies a threshold bandwidth), or a function of a user preference and/or setting of the respective client device 300.

Block 404. Referring to block 404, the method 400 includes receiving a command to execute the first application 216-1. In some embodiments, the command to execute is received at the client device 300. For instance, in some embodiments, a user inputs a command through the input 378 of the client device 300, or if applicable, the display 376 of the client device (e.g., a touch-sensitive display 376). As a non-limiting an example, in some embodiments, the user inputs a command directed at a graphical icon associated with the first application (e.g., third graphical icon 216-1 of FIG. 7A). In some embodiments, the command to execute is provided by the server 200. Allowing the server 200 to provide the command prevents a user of the client device 300 from selecting an inactive application 216 (e.g., an application have a deployment identifier associated with an inactive status), and removes ambiguities from the user about which application 216 on the client device 300 is an active status application 216.

For instance, in some embodiments, in response to receiving the command, the first application 216-1 obtains an identity of the first application 216-1 in the application group 214 of the application gating data structure (e.g., application store 212 of FIG. 2), such as a version identifier and/or a deployment identifier associated with the first application 216-1. In some embodiments, this obtaining the identity of the first application 216-1 is conducted through the interface software of the client device 300 via the communication network 106. For instance, in some embodiments, the client device 300 communicates with the server 200 to obtain the version identifier and/or the deployment identifier associated with the first application 216-1 (e.g., obtain from client device record store 206 and/or application database 212 of FIG. 2). However, the present disclosure is not limited thereto. For instance, in some embodiments, the identifier and/or the deployment identifier are communicated from the server 200 to the client device 300 and then obtained locally (e.g., evaluated) at the client device 300.

Block 406. Referring to block 406, the method 400 includes determining a deployment identifier of the first application 216-1 in response to the receiving of the command to execute the first application 216-1. In some embodiments, the deployment identifier associated with a corresponding application 216 is selected from the group consisting of an active deployment status and an inactive deployment status. The active deployment status indicates a respective application 216 that is executable on the client device 300. On the other hand, the inactive deployment status indicates a respective application 2316 that is not executable or partially executable (e.g., execute to redirect to a second application 216-2). For instance, in some embodiments, a first application 216-1 includes an error that makes the first application 216-1 inoperable for its intended use; however, the error does not fatally incapacitate the first application 216-1. As such, the first application 216-1 is executable, but an inactive deployment status identifier associated with the first application 216-1 prevents the first application 216-1 from being usable at the client device 300. However, the present disclosure is not limited thereto.

In some embodiments, in accordance with a determination that the deployment identifier of the first application 216-1 is the inactive deployment status, the method includes displaying (e.g., on the display 376 of the client device 300) a prompt to the user of the client device 300. In some embodiments, the prompt is a prompt to execute the second application 216-2 (e.g., instead of the first application 216-1), a prompt to terminate the first application 216-1, a prompt to download an update for the second application 216-2, or a combination thereof. However, the present disclosure is not limited thereto. For instance, in some embodiments, the prompt requires user acknowledgement before proceeding as set forth by the prompt (e.g., proceed to block 408 of FIG. 4). However, the present disclosure is not limited thereto.

Block 408. Referring to block 408, the method further includes executing either the first application 216-1 or the second application 216-2 in response to the determining the deployment status of the first application. In some embodiments, in accordance with a determination that the deployment identifier of the first application 216-1 is the active deployment status, the first application 216-1 is executed (e.g., instead of the second application 216-2). Similarly, in accordance with a determination that the deployment identifier of the first application 216-1 is the inactive deployment status, the second application 216-2 is executed (e.g., instead of the first application 216-2).

In some embodiments, the second application 216-2 is executed following displaying of the prompt (e.g., the second application 216-2 is executed after a predetermined period of time elapses since an initial display of the prompt). In this way, the server 200 can execute the second application 216-2 at the client device 300 without input from a user at the client device 300 (e.g., through a user input associated with executing (i.e., deploying) the first application 216-1).

In some embodiments, in accordance with a determination that the first application 216-1 is executed, the second application 216-2 is placed in a disabled state. Similarly, in some embodiments, in accordance with a determination that the second application 216-2 is executed, the first application 216-1 is placed in a disabled state. In some embodiments, the disabled state includes uninstalling the respective application from the client device 300. In some embodiments, the disabled state includes removing the respective application 216 from a user interface of the client devices 300 (e.g., removing or hiding an icon 600 of FIG. 7A associated with the respective application 216 from the user interface of the client device 300). In some embodiments, the disabled state includes a unique graphical representation (e.g., graphical icon 600-3 of FIG. 7A) indicating the disabled state. This graphical representation includes modifying a graphical icon 600 associated with the respective application 216 (e.g., modifying the icon to be a predetermined color, such as grey or black, or merging a predetermined graphical image with the graphical icon 600). Accordingly, the user of the client device 300 is provided with an visual indication that the respective application 216 is in a disabled state, indicating that a second application 216-2 with an active status should be executed instead.

In some embodiments, the first application 216-1 continues to run on the client device 300 in response to a determination that the first application 216-1 is active. In this way, the client device 300 does not impede a usability of the first application 216-1 on the client device 300 and/or resources of the client device 300 by preventing or temporarily inhibiting the first application 216-1 from running on the client device 300. However, the present disclosure is not limited thereto.

In some embodiments, in response to determining that the second application 216-2 is active, the first application 216-1 is terminated on the client device 300 (e.g., one or more processes associated with the first application 216-1 are terminated in the memory of the client device 300). Accordingly, in some embodiments, the second application 216-2 is executed, such as in response to or simultaneous with the termination of the first application 216-1. This executing of the second application 216-2 retrieves some or all of the shared data element 218 on the client device 300 and/or the server 200, allowing the second application 216-1 to utilize shared data element 218 communicated by the first application 216-1, such as transaction shared data element 218-1 of FIGS. 6A and 6B. Accordingly, the second application 216-2 with the active status is allowed to run on the client device 300, while preserving the shared data element 218 associated with an inactive application 216 (e.g., the first application 216-1). In some embodiments, the shared data element is transiently stored at the client device 300 and/or the server 200. However, the present disclosure is not limited thereto.

In some embodiments, the active status (e.g., deployment identifier and/or version identifier) is unique, such that two unique applications 216 cannot each have an active status. However, the present disclosure is not limited thereto. In some embodiments, obtaining the identity of the one active application 216 includes providing a query to the server 200 to obtain the identity of a respective application 214. In some embodiments, the query is provided as an application programming interface (API) call provided by the client device 300. In some embodiments, the query is provided in response to a command provided by a user of the client device 300, or, similarly, provided in response to a command provided by the server 200. In this way, the server 200 can modify an identifier associated with a respective application 216 without direct and/or remote access to a client device 300. From this, the server 200 can inhibit utilizing the respective application 216 at the client device 300 based on one or more identifiers associated with the respective application 216 (i.e., status) communicated to the client device 300.

Now that details of methods 400 for providing an application update deployment system have been disclosed, details regarding a flow chart of processes and features for implementing a method 500 of the system 100, in accordance with an embodiment of the present disclosure, are disclosed with reference to FIG. 5.

Block 502. Referring to block 502 of FIG. 2, the method 500 is conducted at a client device (e.g., client device 300-1 of FIG. 3, client device 300-1 of FIG. 7A, etc.). The client device includes one or more processors (e.g., CPU 392 of FIG. 3) and a memory (e.g., memory 307 of FIG. 3). Additionally, the client device is communicatively coupled to a server (e.g., server 200) by a communication network (e.g., communications network 106 of FIG. 1).

The method 500 includes obtaining an identity of an application in an application group (e.g., second application 216-2 of first application group 214-1 of FIG. 2) from the server 200. This obtaining of the identity is in response to a command to run a first application 216-1 on the client device. Moreover, this command is communicated though the communications network 106. For instance, in some embodiments, a user inputs a command through the client device 300 (e.g., input through graphical icon 600 of FIG. 7A) to execute the first application 216-1, such as tapping on a display 376 of the client device with the tapping directed towards the graphical icon 600 associated with the first application 216-1. This command is then communicated through the communications network to the server 200.

Furthermore, the application 214 includes the first application 216-1 and only one application 216 in the application 214 is designated active at a given time. For instance, in some embodiments, the first application 216-1 is designated active, meaning each application 216 in the application group 214 other than the first application 216-1 is designated inactive (e.g., includes an inactive deployment identifier). In this way, if a third application 216-3 is modified from an inactive designation (e.g., inactive deployment identifier) to an active designation (e.g., active deployment identifier), in response the first application 216-1 is further modified from the active designation to the inactive designation. However, the present disclosure is not limited thereto. For instance, in some embodiments, two or more applications 216 in the application 216 are designated active at a given time. Furthermore, in some embodiments, a subset of applications 216 that is less than all of the applications 216 in the application group 214 is designated active. In this way, at least one application 216 in the application group 214 is designated inactive.

In some embodiments, the client device 300 is a mobile device, such as a smart phone or a smart watch. In some embodiments, the client device is a touch screen mobile device. In this way, in some embodiments, the first application 216-1 and the second application 216-2 are configured to run on an Android operating system 302, an iOS operating system 302, or both.

In some embodiments, the first application 216-1 and the second application 216-2 are different versions of a single point of sale (POS) software application 216. However, the present disclosure is not limited thereto. For instance, in some embodiments, the first application 216-1 and the second application 216-2 are different versions of a communications software application (e.g., a software application 216 that opens a communication channel between a first client device 300-1, a second client device 300-2, the server 200, or a combination thereof).

Furthermore, in some embodiments, the method 400 utilizes a plurality of client device 300, such as one or more client devices 300, two or more client device 300, ten or more client device 300, fifty or more client devices 300, a hundred or more client devices 300, a thousand or more client devices or more, or ten thousand or more client devices 300. In this way, the method 500 can communicate with and control utilization of an application 216 at a multitude of client devices 300, greatly reducing consumption of network 106 bandwidth and a bandwidth of a user of each client device 300.

In some embodiments, the obtaining the identity of the single application 216 designated active includes providing a query to the server 200 to obtain the identity of the single application 216 in the application group 214 that is active. For instance, in some embodiments, the query is provided by the client device 300 in the form of an application programming interface (API) call for the single application 216 having the active identifier. However, the present disclosure is not limited thereto. In some embodiments, the query to obtain the identifier of the single application 216 is a specific query to obtain the identity of the first application 216-1. However, the present disclosure is not limited thereto.

Block 504. Referring to block 504, the method 500 includes continuing to run the first application 216-1 on the client device 300. For instance, in some embodiments, the first application 216-1 continues to run on the client device 300 in response to a determination that an identity of the first application 216-1 matches the identifier of the single application 216 in the application group 214 that is designated active (e.g., includes an active deployment identifier). As a non-limiting example, in response to the query provided by the client device for the single application 216 having the identifier with the active designation. In some embodiments, the first application 216 runs in response to the determination that the first application 216-1 is the single application 216, such that the client device 300 does not execute the first application 216-1 until the response is obtained. However, the present disclosure is not limited thereto. In some embodiments, the determination of an identify of a respective application 216 is based on an evaluation of a table comprising a listing of each identifier associated with the respective application and/or each application 216 of the application group 214.

Block 506. Referring to block 506, the method 500 includes running a procedure in response to a determination that an identity of a second application 216-2 in the application group 214 matches the identity of the single application in the application group 214 that is designated active. The procedure includes terminating the first application 216-1 and executing the second application 216-2. The executing retrieves all or a portion of a shared data element (e.g., shared data element 218 of FIG. 2) stored on the client device 300. Furthermore, the shared data element 218 is shared between the first application 216-1 and the second application 216-2. This shared data element 218 allows an application 216 with an active status to run while preserving shared data 218 associated with an inactive application 218.

Figure 7A:
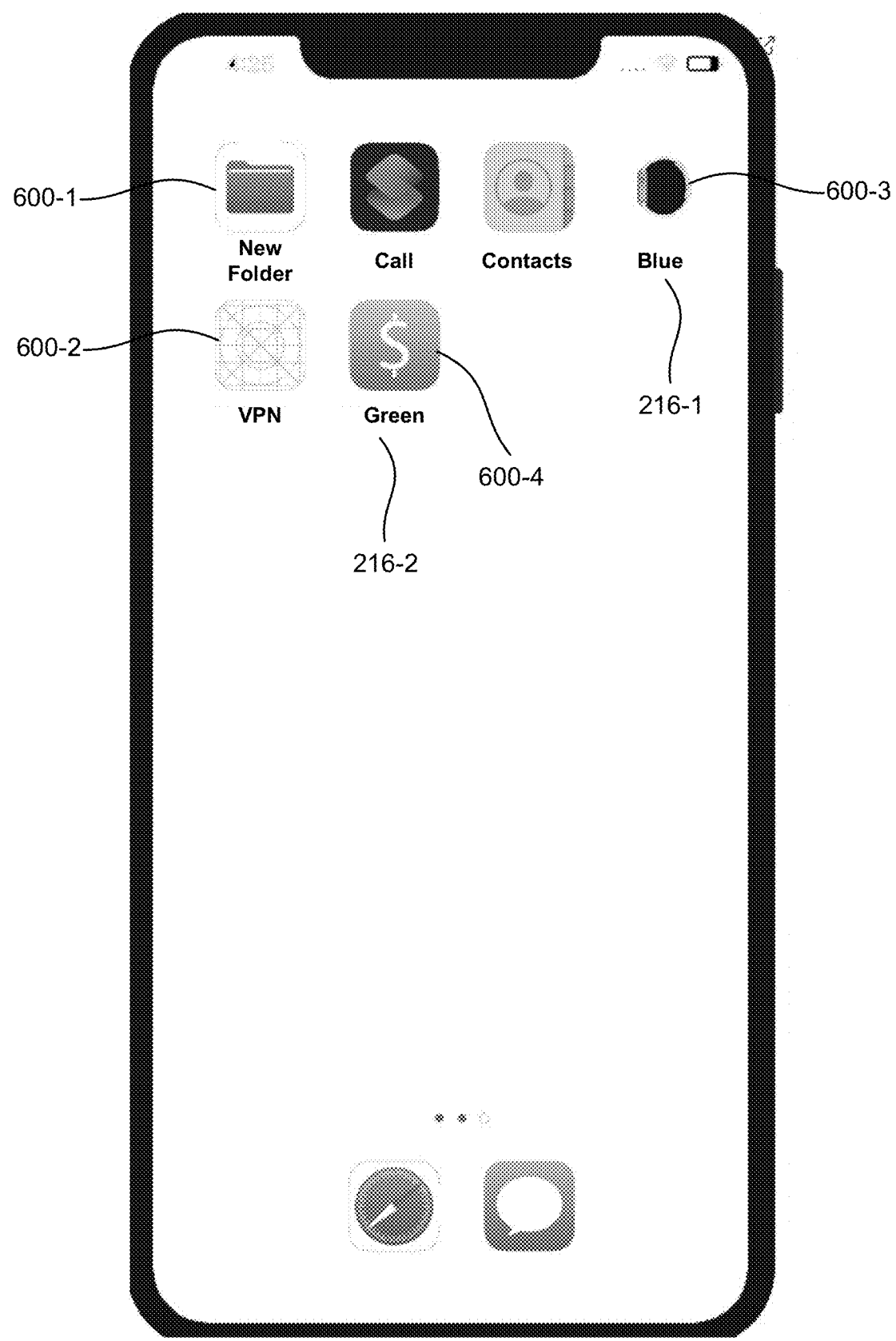
FIGS. 7A, 7B and 7C collectively illustrate user interfaces for deploying an application, in accordance with an exemplary embodiment of the disclosure.
Figure 7B:
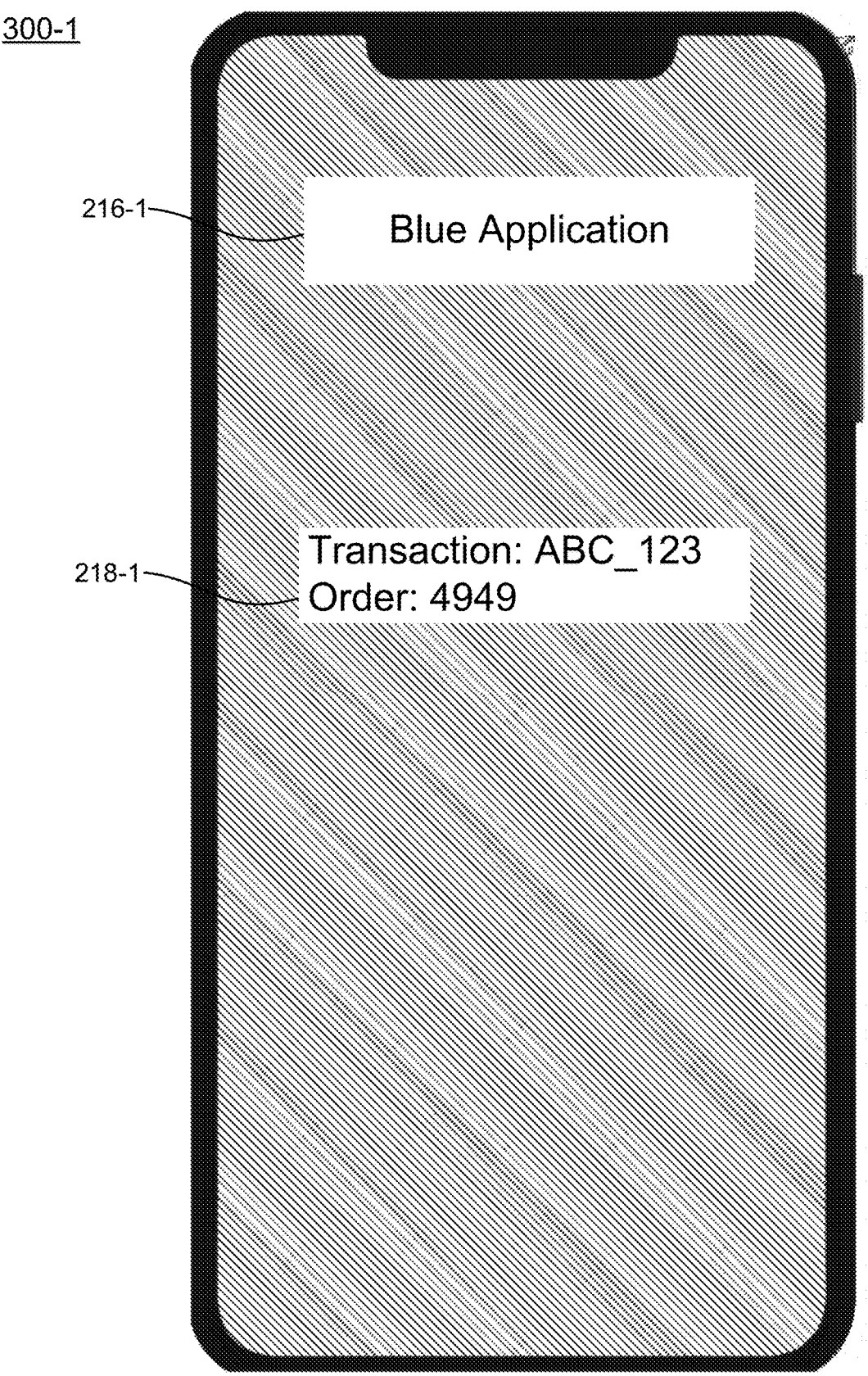
Figure 7C:
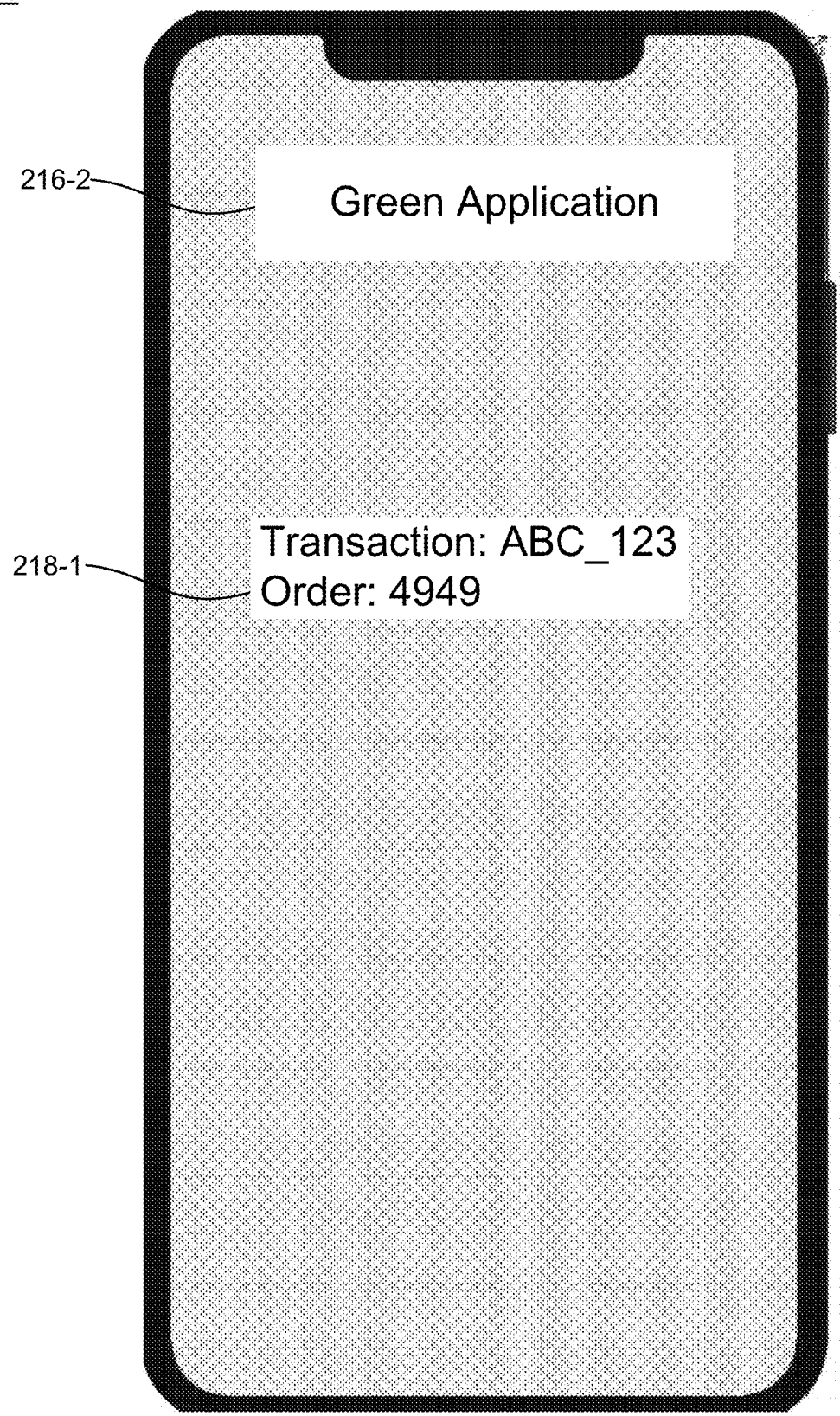

In some embodiments, the procedure further includes modifying a graphical user interface icon associated with the first application (e.g., graphical user interface icon 600-3 of FIG. 7A). In some embodiments, the modifying the graphical user interface icon 600 includes modifying an appearance of the graphical icon 600, such as a color of the graphical icon 600, a color of the graphical icon 600, a transparency of the graphical icon 600, and the like. In some embodiments, the modifying includes replacing a first graphical icon 600-1 associated with the first application 216-1 with a second graphical icon 600-2 associated with the inactive designation.

In some embodiments, the procedure further includes executing a procurement transaction using the second application 216-2. The procurement transaction includes a plurality of processes and information required to form a transaction contract between a first entity and a second entity associated with the point of sales platform. In this way, in some embodiments, the shared data element 218 includes a transaction identifier of a procurement transaction that was executed by the first application 216-1. From this, the method 500 allows for a transaction to initiate and/or complete at a first client device 300-1 running a first application 216-1, and for a second client device 300-2 running the first application 216-1 and/or the first client device 300-1 running a second application 216-1 to access and utilizes the shared data elements 218 from the transaction initiated and/or completed at the first client device 300-1.

In some embodiments, the shared data element 218 includes an AMEX transaction identifier, an amount (e.g., a value of a transaction), an authorization code, an AVS street match, an AVS zip code match, a settlement batch number, a billing address, a card security code match, a client IP address (e.g., electronic address 304 of FIG. 3), a credit card expiration date, a customer code, a description of a procured item, a discount amount, a quantity, a shipping address, a shipping method, a shipping phone number, a tax amount, a tax rate, a tender type, a time stamp, or a universal pricing code for a procurement transaction that was executed by the first application. One skilled in the art will recognize further identifiers and shared data elements 218 that are within the scope of the present disclosure.

In some embodiments, the corresponding shared data element 218 for the first application 216-1 and the second application 216-2 includes an identification of an operating system version, such as a version identifier associated with an operating system 302 of the client device 300. In this way, the first application 216-1 can include an active deployment identifier for more than one type of an operating system 302.

In some embodiments, the corresponding shared data element 218 for the first application 218-1 and the second applications 216-2 includes a storage sled (i.e., single large expensive disk ("SLED")) initialization indication, a storage sled monitoring indication, a storage sled power monitoring indication, a storage sled status, or a combination thereof. In this way, the corresponding shared data element 218 provides information regarding a storage state of the server 200 and/or the one or more client devices 300.

In some embodiments, the corresponding shared data element 218 for the first application 218 and the second applications 218 includes a database location (e.g., a location of a database associated with the client device 300, a location of a database associated with the server 200, or both), a database store type, a configuration name, a store identifier (e.g., a location identifier associated with a brick and mortar store), an employee identifier, or a combination thereof. In some embodiments, the employee identifier includes an indication of a respective employee of a transaction. In this way, the corresponding shared data element 218 includes information regarding an a location and/or subject associated with the corresponding shared data element 218

Figure 6:
FIG. 6 illustrates a user interface for identifying a group of applications, in accordance with an exemplary embodiment of the disclosure.

Referring to FIG. 6, an exemplary user interface for configuring an application group 214 is illustrated. In the present exemplary embodiment, the system is described with respect to an iOS. However, the present disclosure is not limited thereto.

In some embodiments, to enable a shared data element 218 accessible by one or more applications 216 in the same application group 214, a plurality of application group 216 capabilities (e.g., capabilities 502 of FIG. 6) are enabled (e.g., enabled in Xcode), allowing a first application 216-1 to communicate and share data 218 with other applications 216 having the same group identifier (e.g., associated with a corresponding application group 214).

Accordingly, since the applications 216 of a corresponding application group 214 can communicate with each other, a first application 216-1, or similarly a client device 300 having an application store 306 with the first application 216-1, can read a status (e.g., a deployment identifier, a version identifier, a location identifier, etc.) of a second application 216-2 and/or the first application 216-1.

In some embodiments, the application group 214 includes a container. In such embodiments, this reading of the status of a respective application 216 occurs by reading shared data 218 of the container associated with the application group 214 (e.g., obtaining an identifier of a client device record store 206 and/or application database 212 of FIG. 2). In this way, the shared data element 218 includes a corresponding version identifier and/or deployment identifier for each application 216 in the corresponding application group 216. From this, the status of each application 216 can be determined by obtaining the shared data element 218 from server 200.

In some embodiments, the shared data element 218 includes transaction data (e.g., a previous transaction identifier, shared data element 218-1 of FIGS. 6A and 6B), a sled initialization status, an operating system version (e.g., operating system 204 of FIG. 2, operating system 304 of FIG. 3), a transaction record (e.g., TR) version, and the like.

In some embodiments, the applications that share data through a shared data element are different versions of a single point of sale (POS) software application. In some such embodiments, the shared data element 218 comprises a transaction identifier of a procurement transaction that was executed by the first application. In some such embodiments, the shared data element comprises an AMEX transaction identifier (Transaction ID that AMEX assigns to each transaction), an amount (an amount of the transaction), an authorization code (a code returned by the credit card processor when a transaction is approved), an AVS street match (result of an AVS check for street number and name), an AVS zip code match (result of the AVS check for zip code), a settlement batch number (e.g., a first value means the transaction has not been settled and any other value indicated the transaction has been settled), a billing address (a street address submitted with a transaction), a card security code match, a client IP address (an IP address of the Web server to which the transaction was submitted), a credit card expiration date, a customer code, a description of a procured item, a discount amount (any discount applied to the transaction), a quantity, a shipping address, a shipping method, a shipping phone number, a tax amount, a tax rate, a tender type (e.g., type of credit card used for the transaction), a time stamp (a date and time that the transaction occurred), or a universal pricing code (a string describing the units for a line item in a transaction) for a procurement transaction that was executed by the first application.

In some embodiments, the shared data element 218 comprises an identification of an operating system version in which the program is running. In some embodiments, the shared data element 218 comprises a storage sled initialization indication, a storage sled monitoring indication, a storage sled power monitoring indication, or a storage sled status. In some embodiments, the shared data element 218 comprises a database location, a database store type, a configuration name, a store identifier, or an employee identifier.

In some embodiments, the shared data element 218 includes transaction data for 10 or more transactions, 100 or more transactions, or 1000 or more transactions. In some embodiments, the shared data element 218 includes transaction data for 2 or more sales associates, 5 or more sales associates, or 20 or more sales associates. In some embodiments, the shared data element 218 includes transaction data for 2 or more customers, 5 or more customers, or 20 or customers.

In some embodiments, the reading of the shared data element 218 includes using a persistent store coordinator with a shared container location. For instance, in some embodiments, a respective location identifier is obtained from the client device record store 206, such that data related to each client device 300 associated with the respective location identifier is obtained. In this way, the server can modify a status and/or a state of an application 216 (e.g., update, execute, uninstall, terminate, etc.) for one or more application groups 214 at a predetermined location, such as a specific store. For instance, in some embodiments, a pseudo code for such a reading includes:

ingly, if the first application 216-1 is executed, the application will provide a query to the server 200 (e.g., an application programming interface (API) query) to determine which of the applications 216 has an active status. In some embodiments, the query is a request for information of the client device record store 206 of the server 200. If the executed application does not have the active status, in some embodiments, an icon associated with the executed application is modified and/or a prompt is displayed on the user device indicating to execute the application 216 with the active status (e.g., the second application 216-2).

Accordingly, an application update deployment service according to an exemplary embodiment of the present disclosure achieves the advantages of allowing a group of applications to share data during their respective life cycles. This shared data element significantly decreases an amount of time to revert from a first application to a second application since the process of reverting does not need to download or install the shared data element. Furthermore, the service provides a record of each client device and which features are enabled on the respective client device, allowing a user to manipulate the features of each device remotely. Additionally, the present disclosure allows for control of applications at a remote device without having direct control or remote control capabilities over the remote device. Thus, user of the remote device are prevented from utilizes an application that should not be utilized, such as an error prone or beta version of an application.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various alternatives and modifications thereof. It is intended that the scope of the invention be defined by the Claims appended hereto and their equivalents.

What is claimed is:

1. A computer implemented method comprising:
at a server:
storing, in a memory of the server, a plurality of applications and a record of a plurality of client devices, wherein:

```
let fileManager = FileManager.default
let groupDirectory = fileManager.containerURL(forSecurityApplicationGroupIdentifier:
"group.com.entity.ngpos.usersession"
var coredblocation=groupDirectory.appendingPathComponent("sharecoredb.sqlite")
print(coredblocation)
var localcoordinator: NSPersistentStoreCoordinator? =
NSPersistentStoreCoordinator(managedObjectModel: self.managedObjectModel)
do {
    try localcoordinator!.addPersistentStore(ofType: NSSQLiteStoreType,
    configurationName: nil, at: coredblocation, options: nil)
} catch var error as NSError {
localcoordinator = nil
NSLog("Unresolved error \(error), \(error.userInfo)")
```

In some embodiments, to utilize the shared data element 218 by both the first application 216-1 and the second application 216-2, a user default class is used with a suite name as a group name (e.g., a pseudo code of: UserDefaults (suitename: "group.com.entity.ngpos.usersession"). Accordeach respective application in the plurality of applications comprises a corresponding group identifier indicating a group associated with the respective application and a corresponding version identifier indicating a version of the respective application, the record of the plurality of client devices comprises, for each respective client device in the plurality of client devices, the corresponding version identifier for each respective application in the plurality of applications installed on the respective client device, a first application in the plurality of applications has a first group identifier and a first version identifier, a second application in the plurality of applications has the first group identifier and a second version identifier, the first application and the second application are each configured to run on each respective client device in the plurality of client devices, wherein each respective application in the plurality of applications having a corresponding common group identifier includes a corresponding shared data element associated with the corresponding common group identifier;

receiving, at the server, an update for the first application, wherein the update includes modifying the version identifier of the first application to indicate a version associated with the update;

communicating the update for the first application to a first client device in the plurality of client devices; and receiving, at the server, a command to modify the version identifier for a subset of applications in the plurality of applications, wherein, for each respective client device in the plurality of client devices, the modification of the version identifier indicates which respective application in the plurality of applications is executable on the respective client device.

2. The method of claim 1, wherein each respective application in the plurality of applications comprises a corresponding deployment identifier indicating a deployment status of the respective application.

3. The method of claim 2, wherein the corresponding deployment identifier is selected from the group consisting of an active deployment status and an inactive deployment status.

4. The method of claim 1, wherein the record of the plurality of client devices further comprises, for each respective client device in the plurality of client devices, a corresponding location identifier associated with the respective client device.

5. The method of claim 1, wherein each respective application in the plurality of applications having the corresponding common group identifier is stored, on the server, in a single corresponding container associated with the corresponding common group identifier.

6. The method of claim 1, wherein the update for the first application further comprises modifying a graphical display icon associated with the first application.

7. The method according to claim 1, wherein the communicating the update for the first application is in response to a request for an updated application from the first client device.

8. The method of claim 1, wherein the communicating the update for the first application is in response to a command provided by the server to the first client device.

9. The method of claim 1, wherein the communicating the update for the first application is conducted in accordance with a determination of an available bandwidth of a communication network associated with the server and one or more client devices in the plurality of client devices.

10. The method of claim 1, wherein the corresponding shared data element for a common group that comprises the first and second applications comprises first data written by the first application and second data written by the second application.

11. The method of claim 1, wherein the first application and the second application are different versions of a single point of sale (POS) software application.

12. The method of claim 11, wherein the corresponding shared data element for the first and second applications comprises a transaction identifier of a procurement transaction that was executed by the first application.

13. The method of claim 11, wherein the corresponding shared data element for the first and second applications comprises an AMEX transaction identifier, an amount, an authorization code, an AVS street match, an AVS zip code match, a settlement batch number, a billing address, a card security code match, a client IP address, a credit card expiration date, a customer code, a description of a procured item, a discount amount, a quantity, a shipping address, a shipping method, a shipping phone number, a tax amount, a tax rate, a tender type, a time stamp, or a universal pricing code for a procurement transaction that was executed by the first application.

14. The method of claim 11, wherein the corresponding shared data element for the first and second applications comprises a storage sled initialization indication, a storage sled monitoring indication, a storage sled power monitoring indication, or a storage sled status.

15. The method of claim 11, wherein the corresponding shared data element for the first and second applications comprises a database location, a database store type, a configuration name, a store identifier, or an employee identifier.

16. The method of claim 4, wherein the corresponding location identifier includes a physical address associated with the respective client device.

17. The method of claim 1, wherein each respective client device in the plurality of client devices is a mobile device.

18. The method of claim 11, wherein the corresponding shared data element for the first application and the second application comprises an identification an operating system version.

19. A non-transitory computer readable storage medium storing one or more programs, the one or more programs comprising instructions which, when executed by a computer system having a memory, cause the computer system to perform a method comprising:

storing, in the memory of the computer system, a plurality of applications and a record of a plurality of client devices, wherein:

each respective application in the plurality of applications comprises a corresponding group identifier indicating a group associated with the respective application and a corresponding version identifier indicating a version of the respective application, the record of the plurality of client devices comprises, for each respective client device in the plurality of client devices, the corresponding version identifier for each respective application in the plurality of applications installed on the respective client device, a first application in the plurality of applications has a first group identifier and a first version identifier, a second application in the plurality of applications has the first group identifier and a second version identifier, the first application and the second application are each configured to run on each respective client device in the plurality of client devices, wherein each respective application in the plurality of applications having a corresponding common group identifier includes a corresponding shared data element associated with the corresponding common group identifier;

receiving, at the computer system, an update for the first application, wherein the update includes modifying the version identifier of the first application to indicate a version associated with the update;

communicating the update for the first application to a first client device in the plurality of client devices; and receiving, at the computer system, a command to modify the version identifier for a subset of applications in the plurality of applications, wherein, for each respective client device in the plurality of client devices, the modification of the version identifier indicates which respective application in the plurality of applications is executable on the respective client device.

20. A computer system comprising one or more processors, a display, and a memory coupled to the one or more processors, the memory comprising one or more programs configured to be executed by the one or more processors, thereby causing the computer system to perform a method comprising:

storing, in the memory, a plurality of applications and a record of a plurality of client devices, wherein:

each respective application in the plurality of applications comprises a corresponding group identifier indicating a group associated with the respective application and a corresponding version identifier indicating a version of the respective application, the record of the plurality of client devices comprises, for each respective client device in the plurality of client devices, the corresponding version identifier for each respective application in the plurality of applications installed on the respective client device, a first application in the plurality of applications has a first group identifier and a first version identifier, a second application in the plurality of applications has the first group identifier and a second version identifier, the first application and the second application are each configured to run on each respective client device in the plurality of client devices, wherein each respective application in the plurality of applications having a corresponding common group identifier includes a corresponding shared data element associated with the corresponding common group identifier;

receiving, at the computer system, an update for the first application, wherein the update includes modifying the version identifier of the first application to indicate a version associated with the update;

communicating the update for the first application to a first client device in the plurality of client devices; and receiving, at the computer system, a command to modify the version identifier for a subset of applications in the plurality of applications, wherein, for each respective client device in the plurality of client devices, the modification of the version identifier indicates which respective application in the plurality of applications is executable on the respective client device.

* * * * *